Patented Apr. 11, 1939

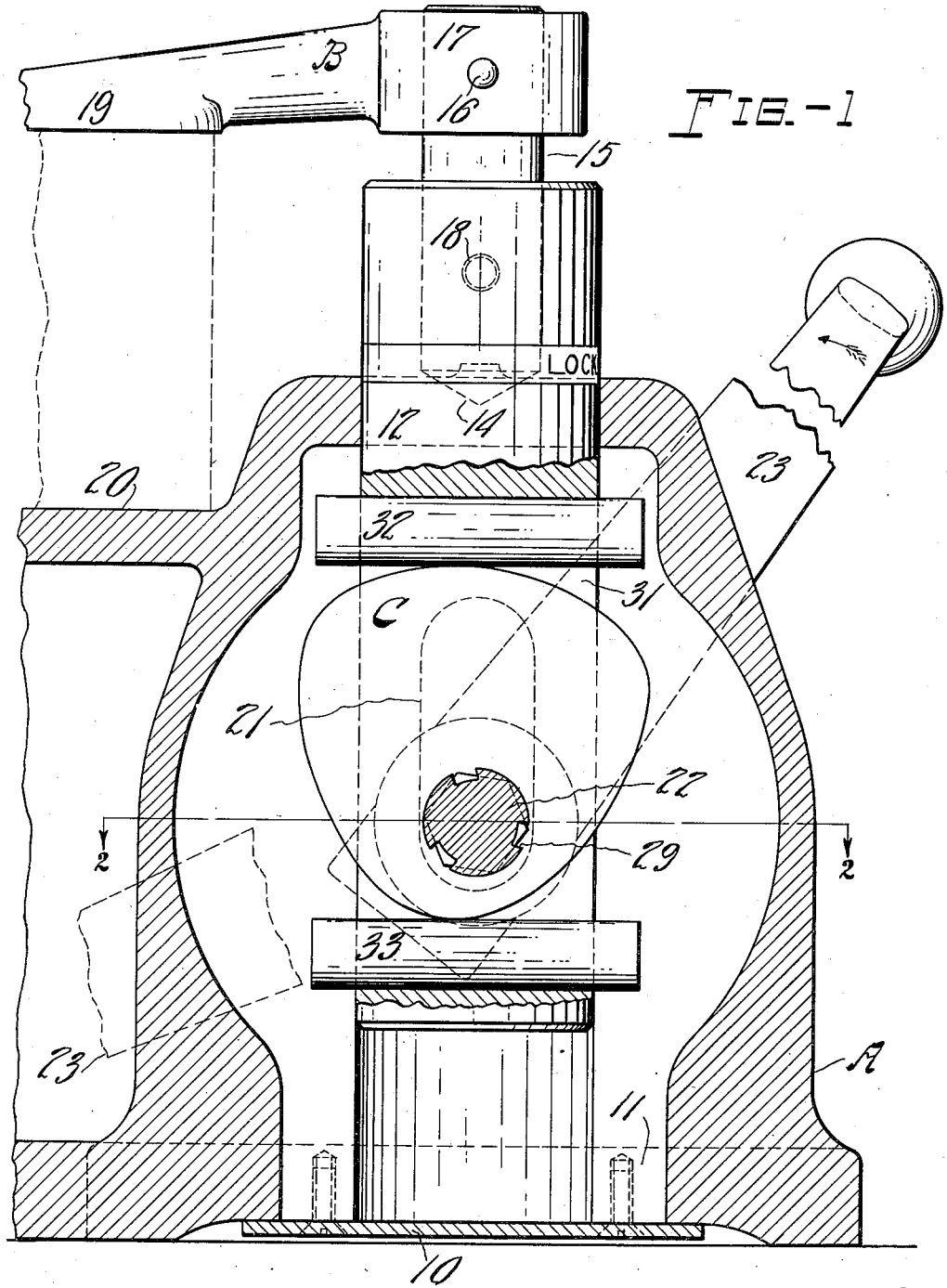

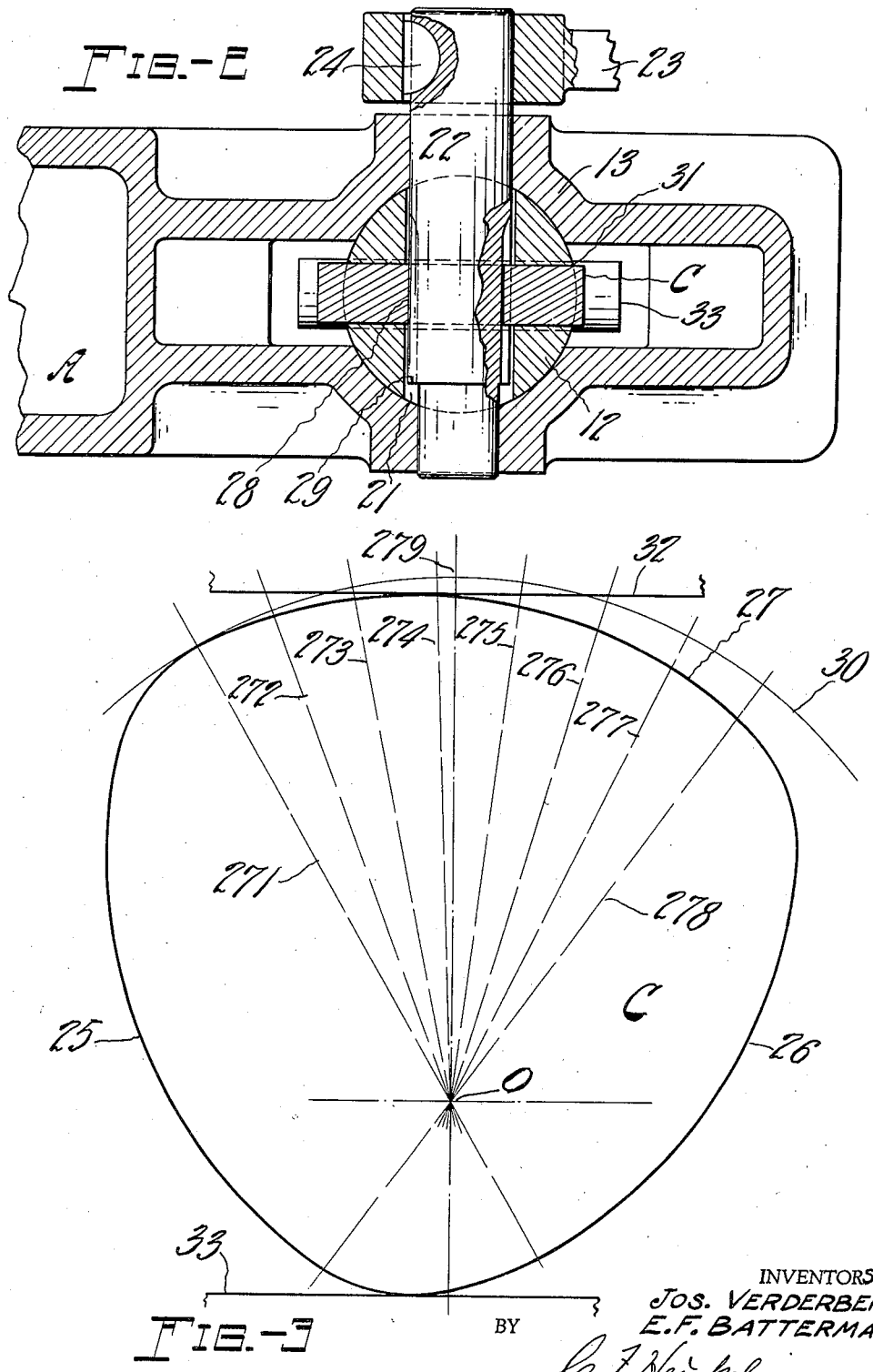

2,153,998

UNITED STATES PATENT OFFICE 2,153,998

CAM MECHANISM

Joseph Verderber, Cleveland, and Elmer F. Batterman, East Cleveland, Ohio

Application February 18, 1937, Serial No. 126,336

1 Claim. (Cl. 90—59)

This invention relates to clamping and specific structure of cams and associated structures for clamping.

The present invention is partly disclosed in the applicants' prior applications Serial No. 616,250 and Serial No. 757,470.

In the prior art, clamping has been done in various manners and with various structures. One of these manners is moving a clamping member by means of known eccentrics; others by arrangements of levers; others by bringing a spring into play. All of such manners have disadvantages. Eccentrics for instance, have the disadvantage that there is only one dead center condition across the largest diameter of the cam so that rotation of the eccentric must stop when the eccentric is in that one dead center condition or else the mechanism will not lock itself against reversing. The same condition exists, in principle, with levers or other similar or equivalent structures.

This invention aims to provide an efficient clamping means that does clamp efficiently and locks the clamping against reversing from a clamping position of the clamping member and eliminates the prior necessity of stopping the rotation of the cam at one particular point of its rotation.

Objects of the present invention are:

To provide a cam and mechanism that moves an element into a position for clamping and clamps the same in that position and locks the same against self reversing by a single rotative movement of a cam.

To provide a cam with a surface that extends a considerable distance circumferentially of the cam as distinguished from such structures as usual eccentrics that must be stopped in rotation when the only dead center condition therein available has been reached so that rotation of the cam need not be stopped at any one particular point of its rotation to effect locking of the clamp.

To provide a cam and mechanism that needs not stop the rotative movement of a cam at any one particular point of rotation and locks the clamping against reversing whenever rotation of the cam is stopped within a large arc of rotation of the cam.

To provide a cam that moves an element into various positions and then exerts a wedging action to lock the cam and associated mechanism against self reversing.

To provide a cam and associated mechanism that moves a clamping member toward and away from an element to be clamped and clamp the element when the clamping member contacts the same and lock the clamping against self reversing when the element is clamped and to release the clamping for release of the clamped element.

Other objects will be pointed out during the description of the device shown in the accompanying drawings or will become apparent or obvious or will suggest themselves upon an inspection of this specification and the accompanying drawings.

The present invention is illustrated in the accompanying drawings showing one application of the present invention although others can be made by suitable modifications. In the drawings mentioned:

Fig. 1 is a section through a clamping device showing the cam in a locked position and having moved the clamping member into a certain position.

Fig. 2 is a transverse section taken on line 2—2 of Fig. 1 showing the relations of the operating lever and cam shaft and cam thereon as related to the clamp moving post.

Fig. 3 is an enlarged view showing the manner of formation of the locking portion of the cam.

Similar reference characters refer to similar parts throughout the views.

The base A, of suitable material and form, preferably hollow to accommodate the elements therein and externally closed to protect the elements therein and has the removable cover 10 to close the opening 11. The cover being provided for access to the interior of the base A and to keep lubricant in the base for continuous lubrication of the mechanism in the base.

The member or post 12 fits longitudinally slidably in the boss 13 and has the counterbore 14 in the upper end thereof to receive the stub 15 to which the clamping plate B is attached by means of the pin 16 driven through the stub and the boss 17 of the plate B. The pin 18 is driven through the stub 15 and the upper part of the post 12 to hold the stub securely to the post. Other means may be used for this purpose. A latch means, indicated by "Lock" in the drawings may be provided to prevent rotation of the post in the base although the mechanism mounted in the post usually keeps the post from rotating in the base.

The clamping plate B has the work contacting part 19 opposite the table 20 on the base. Movement of the plate B downward is to and does clamp work onto the table 20 when the cam C is rotated to a certain extent.

The post 12 has the hole 21 traversely therethrough of sufficient diameter or size to clear the sides of the operating shaft 22 which is journaled in the base and the hole 21 being oblong axially of the post to clear the operating shaft 22 when the post moves vertically. The operating lever 23 is secured to the end of the operating shaft by means of the key 24 so that a rotative movement of the lever 23 moves the shaft 22 rotatively.

The cam C is substantially three cornered or three sided and the cam surface thereof is divided into the two clamp moving portions 25 and 26 and the locking portion 27; the three portions being connected by arcs merging the ends of the portions. The cam has the bore 28 therethrough to fit to the splined portion 29 of the shaft 22 so that the cam rotates with the shaft.

The portion 27 of the cam surface is specially formed although the portions 25 and 26 need not be formed to any specific contour. The formation of the surfaces 25 and 26 entails only the up and down movement of the clamping member B and the portions 25 and 26 may be formed so that this movement may be quick or slow at any portion of this movement best determined by the work that the cam is to do.

The surface 27 (Fig. 3) is here shown, for illustrating purposes as being divided into imaginary sections by the lines 271 to 278, all radial with the axis 0 of the cam, and each spaced from the next one the same distance as any of the other lines on the line 30 which is concentric with the axis 0. The distances of the radial lines 271, etc., to the face 27 varies progressively, preferably in a definitely stepped succession. That is to say, the distance along the line 271, from the line 30 to the line 27 or surface boundary is say 0.001″, the distance of the next one, should be 0.002″ or twice as far as the first one and each successive distance being twice as far as the preceding one throughout the portion 27. This progressive increasing to the dimensions here set down is not to be followed in all cases and the distances can be varied as to lengths thereof although it is preferred that these distances increase in mathematical relations that is to say that each distance has a certain mathematical relation to the preceding one such as 2 plus ½ or 4 plus 1½ as the case may be. The object being to provide a locking surface that moves a clamp post progressively throughout this movement thereof and avoid the danger of a cam moving a locking member in such a manner that some parts of the locking surface wedge the cam tighter than others. The diameter of that portion of the cam surface between the lines 271 and 278 is constant and is equal to the distance between the abutment members. The point on the surface 27 intersected by the line 271 is the highest point on the cam and limits the upward movement of the clamping member.

In such structures as usual eccentrics, there is only one real dead center condition across the diameter of the eccentric. The eccentric surface does not progress mathematically relative to the axis of the eccentric; some portions of it move a clamping member more rapidly than others and there is no real formation of the cam surface that would provide a wedging for the eccentric because the curvature of the surface portions on one side of a given line are different than on the other side and there is no real locking since a member on the higher curvatures on the one side will tend to move onto the lower curvature on the other side. The formation of the locking portion given above presents a member with a portion that is as nearly radial with the axis of the cam as is possible and the contacting portion is as square as possible with the radial axis of the contact of a member on the cam.

It is to be noted that Fig. 3 is illustrative of the formation of the locking surface 27 and is not to be taken as showing actual construction. The radius for the arcuation of the line 27 being shorter than in actual construction. The figure is illustrative of showing the peripheral spacing of imaginary radii and the differences of lengths between them.

In this showing in Fig. 3, the radii therein shown are spaced equal distances from each other along the peripheral edge of the face 27 and each radius differs in length by an amount equal to the amount that each radius differs from its adjacent radius. This amount of difference in length is quite small between adjacent portions of the locking surface so that the clamping member moves very little during a comparatively larger rotative movement of the cam and thereby clamps work quite tightly and locks the cam against reversing since the difference between the portions of the locking surface is so slight that a pressure brought on the cam by the clamping member can not reverse the same since there are no inclinations thereof that could afford a means for moving the cam reversely when rotation of the cam stops while the locking surface of the cam is in contact on one of the abutment members. This rotative movement of the cam requires no power above the usual moving power but it does clamp the work tightly and the releasing of the locking is also quite easy and the cam remains locked effectively and positively while rotation thereof is stopped when the locking surface is contacting both of the abutments.

The cam surface, especially the locking portion 27 thereof is specially formed either by hand formation or by special machine formation or special development since there is no mechanism known now that will form a surface such as is described here and made use of in the present invention.

The cam C extends into the slot 31 and the abutments 32 and 33, opposite each other are both driven into the post 12 to anchor them and a portion thereof extends into the slot 31 at the corresponding ends thereof so that the cam in the slot can contact both of the abutment members; the latter being renewable when they become worn or for other reasons.

As to operation of the device shown and described:

Fig. 1 shows the mechanism in positions for locking the clamping of a work piece between the part 19 of the clamp and the table 20 on the base. The cam is in a dead center condition on the line 279 (Fig. 3). The abutment member 32 is at right angles with this line 279 and there is no tendency of pressure from the abutment pin 32, endwise of the cam, from moving the cam in either direction since a dead center condition is present and there is no high point on the cam at either side of the line 279 to cause or promote a rotative movement of the cam or, in other words, a pressure on the clamping plate transmitted to the abutment member 32 can not move the cam rotatively and, as long as there is no movement of the cam there can, of course be no movement of the clamping plate and the latter can not reverse unless the shaft 22 is moved rotatively by the handle or lever 23. Consequently, the clamping plate is locked against self reversing and can be moved only by taking hold of the lever and rotatively moving the shaft. This dead center condition will retain a clomping member in clamping position even when wedging of the cam is not resorted to.

Fig. 1 shows the lever 23 and the cam C as being rotated to a certain position relative to the base A, the clamping plate B contacting the top of a work piece resting on the table surface 20. A portion of the cam surface 27 being in contact on the pin or abutment member 32 and a portion of the peak part at the bottom of the cam in contact on the abutment member 33. This contact and relations of cam and abutment members prevents longitudinal movement of the part 12 in either direction by pressure brought onto the clamping member B so that work is held between the faces 19 and 20.

When more tight holding of work is desired, a further rotative movement of the lever 23 in the direction of the arrow thereon, moves the shaft 22 and the cam C rotatively and thereby tends to move the clamping plate downwardly and into more tight contact on the work piece for more tightly clamping thereof against the table 20.

By this rotative movement of the lever 23, a portion of the peaked part of the cam which is a little further distant from the axis of the cam than what is shown, now contacts the abutment member 33 and thereby tends to move the clamping member downwardly and into more tight contact on the work piece.

When the cam C is positioned as shown, a part of the cam surface 27 contacts the abutment member 32 and prevents the shaft 12 from moving in either longitudinal direction but, when the cam C is rotated as described, the cam moving in the direction of the arrow, the newly established contact point between the cam and the abutment pin will be a less distance from the axis of the cam than is shown and the clamping plate B moves downwardly the same distance as the peaked part of the cam at this point moves relative to the axis of the cam since the cam measures the same across any diameter thereof. This arrangement locks the clamping member against movement in either direction by pressure brought upon the clamping plate B.

For work releasing, the lever 23 is rotated in the direction opposite to the arrow shown on the lever 23. The portions of the cam to the left of the line 279, Fig. 3, being further distant from the axis of the cam than the portions to the right of this line brings a differently distant part of the cam, measured from the axis of the cam, into contact on the abutment member 32 and thereby moves the clamping plate B upwardly and releases the work piece on the table 20. The lower portion of the cam operates in conformity with the upper part since the cam measures the same across any diameter thereof.

For work clamping, the lever 23 is rotatively moved in the direction of the arrow shown thereon and the operations and movements are reversed from those for releasing the work piece.

After a new work piece is placed on the table 20 and the lever 23 is moved rotatively in the direction of the arrow shown thereon, rotative movement of the shaft 22 by means of the lever 23 rotatively moves the cam and, the cam measuring the same across any diameter thereof, the post 12 and the clamping plate move downwardly until the clamp part 19 contacts the work piece. This stops further free movement of the clamping member. A continued movement of the lever 23 rotatively moves the cam further and thereby takes up all lost motions and clamps the work tightly and also wedges the cam against the abutment pins to prevent self reversing thereof. The amount of wedging being controlled by the pressure put on the lever so that various degrees of wedging can be attained and the wedging can be released only by rotatively moving the lever. There is no possibility of the clamping plate releasing itself and releasing work except through the lever 23.

Various modifications may be made. In some devices, for instance, the slot through the post for the cam may weaken the post too much. In such cases, the slot through the post may be omitted and a recess or depression put into one side of the post to accommodate the cam and the axis of the post may be at one side of the axis of the shaft.

The cam here shown is substantially triangular and the three sides thereof are merged at the ends by short radii curves but this is not absolutely necessary and the clamp moving portions 25 and 26 may have the ends thereof merge into the portion 27 in any manner. It is preferred however that such merging is smooth so as not to cause too sudden or abrupt changes in the movement of the post.

The layout points shown in Fig. 3 are, of course, connected by curves as shown; the layout points are merely to show the general contour to be provided on the surface 27.

It is not necessary that the increasing distance be successively added and that a multiple factor be used; it is preferred however that a definite distance factor be added for each successive distance from the axis of the cam.

The device shown and described is economical of structure and operation and moves an element positively in opposite directions; locks itself against self reversing by its own clamping movement; and must be manually released and therefore can not release a clamping member nor a work piece until manually released.

Having described the present invention and the mode of operation thereof and without limiting ourselves to the precise structure and arrangements of parts as shown and described,

We claim:

An operating means for work clamping and work releasing, including, a base, a post mounted in said base to move reciprocatively longitudinally and having a work clamping and work releasing member secured thereto and a transverse recess intermediate the ends thereof, a cam abutment member removably mounted in said post at opposite ends of said recess, a rotatable shaft journaled in said base and extending through said post free of contact thereon, and a cam eccentrically fixed to said shaft and having a cam surface comprising two portions formed to move said clamping member toward and away from a work piece on said base corresponding to rotative movement of said shaft when either of said portions are in contact with one of said abutments and a clamping portion comprising substantially one third of the length of said cam surface and having a diameter equal to the distance between said abutments so that the clamping portion of said cam contacts both of said abutments, a high point adjacent one of said first named portions limiting the upward movement of said clamping member and points adjacent to and below said high point for limiting movement of said clamping member to distances less than the distance of movement by said high point and locking said clamping member against reversing when rotation of said cam stops while any of said points adjacent contacts said abutment members.

JOSEPH VERDERBER.
ELMER F. BATTERMAN.